United States Patent Office 2,850,473
Patented Sept. 2, 1958

2,850,473

LIQUID RESINOUS ORGANOPOLYSILOXANES OF INCREASED VISCOSITY AND METHODS FOR PREPARING THE SAME

Frederick M. Lewis and Joseph R. McLoughlin, Ballston Lake, N. Y., assignors to General Electric Company, a corporation of New York No Drawing. Application August 19, 1955
Serial No. 529,584

7 Claims. (Cl. 260—33.6)

The present invention relates to polysiloxane resins of increased viscosity obtained without a heat-bodying step. It is particularly concerned with increasing the viscosity of a liquid organopolysiloxane resin by incorporating therein small amounts of a high molecular weight polymethyl methacrylate compatible with both the uncured and cured organopolysiloxane resin.

Polysiloxane resins of the type with which the present invention is concerned are described in U. S. Patent 2,449,572—Welsh, which by reference is made part of the disclosures of the present invention. These resins comprise a plurality of organic-substituted, for instance, hydrocarbon-substituted, silicon atoms linked by oxygen atoms, and are prepared, for example, by hydrolysis and condensation of a mixture of organohalogenosilanes. The commercially useful products contain an average of more than one and less than two, preferably from about 1.1 to about 1.7 hydrocarbon radicals per silicon atom, are soluble in various solvents and are converted to the hardened state when heated at elevated temperatures advantageously in the presence of organometallic compounds of the type described in the above-mentioned Welsh patent.

The present invention is based on the discovery that small amounts of a high molecular weight polymethyl methacrylate incorporated in the organopolysiloxane resin, while dissolved in a solvent, can be used to increase the viscosity of the liquid, heat-hardenable polysiloxane resins so as to yield higher viscosity resins without any heating or bodying step, and which permits heavier films to be applied in one operation in the case of dipping or spray coating. In addition, the organopolysiloxanes of increased viscosity are quite stable at room temperatures and can more rapidly be condensed, i. e., cured at lower temperatures, than an organopolysiloxane which has been bodied thermally.

In the past, unless organopolysiloxane resins were bodied by heating the same at elevated temperatures usually in the presence of bodying agents, such as zinc oxide, metallo-organic salts, such as cobalt naphthenate, tin octoate, etc., the viscosity of the resin solution was generally too low so that when employed in dipping or spraying operations, insufficient build was obtained. When higher viscosity resin solutions were used in order to prevent excessive dripping of films obtained by either dipping a surface in the resin solution or spray coating the surface with the resin solution, it was difficult to obtain adequate penetration of porous bodies with the resin. Various attempts have been made to overcome the foregoing difficulties, but with each attempt it was necessary to use a preformed bodying agent in the resin solution and also to apply heat until the desired viscosity was obtained. This involved an added and expensive operation in preparing organopolysiloxane resins suitable for dipping or coating purposes and, in addition, difficulty was often encountered in obtaining the desired degree of viscosity as a result of such a bodying step.

We have now discovered that we are able to body or increase the viscosity without increasing the molecular weight of the liquid organopolysiloxane resins dissolved in a suitable solvent by incorporating in the resin a polymethyl methacrylate of a certain molecular weight (or of a certain intrinsic viscosity) employing amounts of the polymethyl methacrylate which are sufficient to adjust the viscosity of the silicone resin to the desired level, and yet remain compatible with the resin in its uncured form and also compatible with the resin in the cured form, for instance, in the form of a cured film. The amount of polymethyl methacrylate used is critical depending upon such factors as the type of organopolysiloxane resin involved, the solvent used for the resin, the solids content of the organopolysiloxane resin, the degree of condensation of the organopolysiloxane resin, the molecular weight of the polymethyl methacrylate, etc. Generally, we prefer to use a polymethyl methacrylate of an intrinsic viscosity in benzene of between 1.5 to 6.0 (on a gram/100 cc. scale) in an amount ranging from about 0.4 to 2 percent of the weight of the organopolysiloxane resin in the solution. Amounts below 0.4 percent will not give the desired viscosity increase, while amounts above 2 percent will cause an undesirable decrease in the hot strength of the cured films of the organopolysiloxane. The average molecular weight should be within 500,000 to 3,000,000 molecular weight when determined by viscosity measurement in benzene using the formula of Baxendale et al., Journal Polymer Science, vol. 1, page 237 (1946):

m (molecular weight)$=2.81 \times 10^5 \times |\eta|_{C_6H_6}^{1.32}$ where $|\eta|_{C_6H_6}$ is intrinsic viscosity in benzene (on grams/100 cc. scale).

By means of this use of high molecular weight polymethyl methacrylate, it is possible to raise the viscosity of an unbodied resin (which may have a viscosity of from 10 to 35 centipoises at 50 percent solids, when measured at 25° C.) to equal that of a bodied resin of the same solids content in the resin solution, without the necessity of using heat or any bodying agent. The ability to effect such increase in viscosity without bodying the resin to a higher molecular weight by the use of heat and a preformed bodying agent is particularly important because thermally bodying a resin slows down its rate of cure, detracts from its mechanical properties at high temperatures, decreases its stability in storage, and increases its cost. By means of our invention, all these defects of the prior art bodying means are obviated and material cost reductions are effected. As another advantage of using our method for increasing the viscosity of organopolysiloxanes, there is less tendency for films of such resins to bubble and blister during cure than it is for a resin of the same viscosity obtained by heat-bodying. The organopolysiloxanes containing the polymethyl methacrylate unexpectedly have higher pick-up or build at the increased viscosity than do organopolysiloxanes of similar viscosities obtained by thermally bodying. This permits more ready penetration of the resin into porous surfaces without decreasing the build. Heretofore, when employing high viscosity materials to obtain desired build-up, one was frequently faced with the problem of poor penetration of the resin.

The intrinsic viscosity (in benzene) of the polymethyl methacrylate is also critical. If too low an intrinsic viscosity is used (i. e., molecular weights well below 500,000), too much of the polymethyl methacrylate must be added to obtain the same viscosity at a given solids content as is obtained using a polymethyl methacrylate of higher intrinsic viscosity. Using the lower intrinsic viscosity polymethyl methacrylate, the resulting organopolysiloxane resin has much poorer mechanical properties at high temperatures than the resin prepared with a lower concentration of the higher molecular weight polymethyl methacrylate employed in the practice of the presently claimed invention. In addition, the lower intrinsic viscosity polymethyl methacrylate imparts poorer heat life. Too high a molecular weight (e. g., substantially above 3,000,000 molecular weight) causes insolubility and incompatibility problems with regard to the solution of uncured resins and also with regard to the cured films of the resin.

The organopolysiloxane resins in which the polymethyl methacrylate is incorporated are generally any of those referred to above in the Welsh patent. These resins, which are usually prepared from the hydrolysis of organohalogenosilanes, are generally obtained in the form of solutions in suitable solvents of from about 30 to 60 percent solids content (higher or lower solids contents may be used). Among the solvents in which the organopolysiloxane resin may be dissolved are, for example, aromatic solvents, for instance, benzene, toluene, xylene, etc.; inert halogenated hydrocarbons, such as trichloroethylene, etc.; high boiling hydrocarbons, for example, high boiling fractions of petroleum spirits (such as the Solvessos, Hi-Flash Naphtha), etc. The particular solvent employed is not critical and the only desirable properties of the solvent should be that it is inert to the resin and to the polymethyl methacrylate and that the polymethyl methacrylate be soluble in the solvent. In addition, it should be of a sufficiently proper boiling point so that it can be readily volatilized at the elevated temperatures at which the organopolysiloxane solution will be used.

In order that those skilled in the art may better understand how the present invention may be practiced, the following examples are given by way of illustration and not by way of limitation. All parts are by weight.

EXAMPLE 1

100 parts of a mixture of organochlorosilanes comprising, by weight, about 60 percent phenyltrichlorosilane and 40 percent dimethyldichlorosilane were blended with 90 parts toluene and this mixture of ingredients thereafter added with stirring to a hydrolyzing medium comprising 400 parts water over about a one-hour period. The water layer thereby obtained was removed. The resin solution in toluene was then treated with fuller's earth and Celite and the mixture filtered to give a resin solution which was thereafter subjected to vacuum strip distillation at a low enough temperature (about 80-90° C.) to give a product of about 60 percent solids and having a viscosity of about 25 centipoises at 25° C. About 0.4 part polymethyl methacrylate granules (of 4.95 intrinsic viscosity in benzene in grams per 100 ml. of solution which is equivalent to a molecular weight of about 2,330,000) dissolved in toluene in the form of a 7 percent weight solution (in toluene) was thereafter added to the resin solution, and the resin solution was cut back to a solids content of about 50 percent, to give a final viscosity of about 75 centipoises at around 25° C. The amount of polymethyl methacrylate added was equal, by weight, to 0.7 percent of the weight of the resin solids in the resin solution. The above resin solution of 75 centipoises viscosity, as well as a resin solution (50 percent solids) from which the polymethyl methacrylate was omitted (which had a viscosity of about 10 centipoises), was mixed with a curing agent, specifically zinc octoate, in an amount equal to give about 0.3 part zinc metal which is about 0.5 percent of the organopolysiloxane resin solids in the resinous solution. Into each of the resinous solutions were dipped transformer glass-served wire coils, the coils removed and allowed to drain. It was found that the coils treated with the resinous solution containing the polymethyl methacrylate had a build or thickness of coating thereon of about three to five times that of the sample treated with the organopolysiloxane resin solution from which the polymethyl methacrylate was omitted. In addition, whereas more than 50 percent of the silicone resin dripped off under equivalent conditions from the coil treated with the organopolysiloxane resin solution from which the polyethyl methacrylate was omitted, the other coil lost by drip-off at most 5 percent of the resin containing the high molecular weight polymethyl methacrylate. Using a high viscosity material without bodying permits employing resins of greater reactivity so that such resins, when applied to the electrical coil, could be cured at lower temperatures than was possible by heating the coil coated with the organopolysiloxane resins from which the polymethyl methacrylate was omitted.

The following example shows the variations in viscosity capable of being attained by using varying small amounts of the polymethyl methacrylate in a silicone resin solution.

EXAMPLE 2

To a methyl phenylpolysiloxane resin toluene solution prepared similarly as in Example 1 of about 50 percent solids, were added varying amounts of polymethyl methacrylate of the same molecular weight as described in Example 1. The viscosity in centipoises of the resin solution after addition of the polymethyl methacrylate was determined in each instance by means of a Brookfield viscosimeter measured at 25° C. The following Table I shows the different viscosities obtained by means of the varying proportions of the polymethyl methacrylate. The percent polymethyl methacrylate recited in the table is a weight percent based on the weight of the resin solids in the resinous solution.

Table I

| Percent polymethyl methacrylate: | Viscosity in Centipoises |
|---|---|
| 2.00 | 349 |
| 1.50 | 229 |
| 1.25 | 167 |
| 1.00 | 122 |
| 0.80 | 96 |
| 0.60 | 70 |
| 0.40 | 45 |
| 0.00 (control) | 20 |

While the invention has been described with particular reference to a methyl phenylpolysiloxane resin, it is to be understood that it is broadly applicable to any soluble polysiloxane resin in which the hydrocarbon radicals attached to silicon by carbon-silicon linkage in the polysiloxane chain may be, for instance, aliphatic radicals (e. g., alkyl, for example, methyl, ethyl, propyl, butyl, isobutyl, decyl, etc.; vinyl, allyl, etc.), aryl (e. g., phenyl, naphthyl, anthracyl, etc.), alkaryl (e. g., tolyl, xylyl, ethylphenyl, etc.), aralkyl (e. g., benzyl, phenylethyl, etc.), cycloaliphatic (e. g., cyclopentyl, cyclohexyl, cyclohexenyl, etc.), etc. radicals. The presence of silicon-bonded vinyl radicals is not precluded. Such resins may also contain two or more different radicals attached to the silcon atom as, for example, methyl phenylpolysiloxane resins. If desired, the hydrocarbon radicals may be substituted with non-reactive substituents, as, for example, halogens, e. g., chlorine, bromine, etc.

In addition to the zinc octoate employed as a curing agent above, other cure accelerators in varying amounts may be incorporated prior to use of the resin solution, for instance, for application to various surfaces. The metal salts of organic acids soluble in such resin solutions are especially suitable for the purpose and are more particularly disclosed in the above-mentioned U. S. Patent 2,449,572.

The amount of polymethyl methacrylate, as well as the intrinsic viscosity of such polymethyl methacrylate (which indicates a molecular weight level), may be varied within the ranges previously mentioned without departing from the scope of the invention.

The organopolysiloxane resins of increased viscosity described in the instant application may also be used in combination with various fillers, such as glass fibers, glass cloth, cotton cloth, asbestos fibers, etc., from which molded or laminated products may be prepared. Obviously, no filler may be required in applications where the organopolysiloxane resin is employed for insulating or for coating purposes, for instance, in connection with metallic conductors or for the protection of metallic surfaces, such as in the coating of bread baking pans. If desired, dyes and pigments, such as, for instance, titanium dioxide, etc., may be added to the organopolysiloxane resin of increased viscosity prior to its use in various coating applications.

What we claim as new and desire to secure by Letters Patent of the United States is:

1. A composition of matter comprising (1) a hydrocarbon-substituted polysiloxane containing an average of from 1.1 to 1.7 hydrocarbon groups per silicon atom in the form of a solution in which the solvent for the resin is selected from the class consisting of aromatic solvents, inert halogenated hydrocarbons, and high boiling fractions of petroleum spirits, and (2) polymethyl methacrylate dissolved in (1) and having an average molecular weight of between 500,000 to 3,000,000, said polymethyl methacrylate having an intrinsic viscosity in benzene of from 1.5 to 6 and being present, by weight, in an amount equal to from 0.4 to 2 percent of the weight of the organopolysiloxane resin solids.

2. A composition of matter comprising (1) a methylpolysiloxane resin solution in which the solvent for the resin is selected from the class consisting of aromatic hydrocarbons, halogenated hydrocarbons, and high boiling fractions of petroleum spirits, and in which the methylpolysiloxane contains an average of from about 1.1 to 1.7 methyl groups per silicon atom and (2) polymethyl methacrylate dissolved in (1) and having an average molecular weight of between 500,000 to 3,000,000, said polymethyl methacrylate having an intrinsic viscosity in benzene of from 1.5 to 6 and being present, by weight, in an amount equal to from 0.4 to 2 percent of the weight of the methylpolysiloxane resin solids.

3. A composition of matter comprising (1) a methyl phenylpolysiloxane resin solution in which the solvent for the resin is selected from the class consisting of aromatic hydrocarbons, halogenated hydrocarbons, and high boiling fractions of petroleum spirits, and in which the methyl phenylpolysiloxane contains an average of from about 1.1 to 1.7 total methyl and phenyl groups per silicon atom and (2) polymethyl methacrylate dissolved in (1) and having an average molecular weight of between 500,000 to 3,000,000, said polymethyl methacrylate having an intrinsic viscosity in benzene of from 1.5 to 6 and being present, by weight, in an amount equal to from 0.4 to 2 percent of the weight of the methyl phenylpolysiloxane resin solids.

4. A composition of matter comprising (1) a solution of a hydrocarbon-substituted polysiloxane containing an average of from about 1.1 to 1.7 hydrocarbon groups per silicon atom, the solvent for the polysiloxane solution being selected from the class consisting of aromatic hydrocarbons, inert halogenated hydrocarbons, and high boiling fractions of petroleum spirits, (2) polymethyl methacrylate having an intrinsic viscosity in benzene of from 1.5 to 6 and having a molecular weight between 500,000 and 3,000,000 and being present, by weight, in an amount equal to from 0.4 to 2 percent based on the weight of the resin solids of (1), and (3) as a curing agent for the hydrocarbon-substituted polysiloxane, a metallic salt of an organic carboxylic acid.

5. The process for increasing the viscosity of an hydrocarbon-substituted polysiloxane resin solution without thermally bodying the resin solution, said hydrocarbon-substituted polysiloxane containing an average of from about 1.1 to 1.7 hydrocarbon groups per silicon atom, and the solvent for the resin being selected from the class consisting of aromatic solvents, inert halogenated hydrocarbons, and high boiling fractions of petroleum spirits, which comprises dissolving in the aforesaid polysiloxane resin solution polymethyl methacrylate having an intrinsic viscosity in benzene of from 1.5 to 6 and having a molecular weight of from about 500,000 to 3,000,000, in an amount equal to from 0.4 to 2 percent, by weight, based on the weight of the hydrocarbon-substituted polysiloxane resin solids.

6. The process for increasing the viscosity of an aromatic hydrocarbon methylpolysiloxane resin solution without thermally bodying the resin solution, said methylpolysiloxane containing an average of from about 1.1 to 1.7 methyl groups per silicon atom, which process comprises dissolving in the aforesaid resin solution from 0.4 to 2 percent, by weight, based on the weight of the methylpolysiloxane resin solids, of polymethyl methacrylate having an intrinsic viscosity in benzene of from 1.5 to 6 and having a molecular weight of from 500,000 to 3,000,000.

7. The process for increasing the viscosity of an aromatic hydrocarbon methyl phenylpolysiloxane resin solution without thermally bodying the resin solution, said methyl phenylpolysiloxane containing an average of from 1.1 to 1.7 total methyl and phenyl groups per silicon atom, which process comprises dissolving in the aforesaid resin solution from 0.4 to 2 percent, by weight, based on the weight of the methyl phenylpolysiloxane resin solids, of polymethyl methacrylate having an intrinsic viscosity in benzene of from 1.5 to 6 and having a molecular weight of from 500,000 to 3,000,000.

References Cited in the file of this patent

UNITED STATES PATENTS

| 2,442,613 | Nicodemus | June 1, 1948 |
| 2,528,535 | Merker | Nov. 7, 1950 |

OTHER REFERENCES

Official Digest, November 1945, page 437.
Official Digest #266, March 1947, page 151.
Merker et al.: "Extreme Temperature Lubricating Greases," pages 2548–2550. In. Eng. Chem., volume 41, No. 11, November 1949.

UNITED STATES PATENT OFFICE
CERTIFICATE OF CORRECTION

Patent No. 2,850,473 September 2, 1958

Frederick M. Lewis et al.

It is hereby certified that error appears in the printed specification of the above numbered patent requiring correction and that the said Letters Patent should read as corrected below.

Column 6, line 39, after "from" insert -- about --.

Signed and sealed this 14th day of April 1959.

(SEAL)
Attest:
KARL H. AXLINE

Attesting Officer

ROBERT C. WATSON
Commissioner of Patents